(12) United States Patent
Deschênes

(10) Patent No.: US 9,091,078 B2
(45) Date of Patent: Jul. 28, 2015

(54) ATTACHMENT DEVICE FOR SHEET TYPE CONSTRUCTION SIDING

(75) Inventor: Philippe Deschênes, Montreal (CA)

(73) Assignee: Deschênes Innovations Inc., Boucherville, QC ( * ) Notice: Subject to any disclaimer, the term of this patent is extended or adjusted under 35 U.S.C. 154(b) by 0 days.

(21) Appl. No.: 14/114,944

(22) PCT Filed: May 3, 2012

(86) PCT No.: PCT/CA2012/000414
§ 371 (c)(1),
(2), (4) Date: Jan. 20, 2014

(87) PCT Pub. No.: WO2012/149640
PCT Pub. Date: Nov. 8, 2012

(65) Prior Publication Data
US 2014/0123585 A1    May 8, 2014

Related U.S. Application Data

(60) Provisional application No. 61/482,024, filed on May 3, 2011.

(51) Int. Cl.
*E04F 13/08* (2006.01)
*E04F 13/12* (2006.01)
(Continued)

(52) U.S. Cl.
CPC ......... *E04F 13/0801* (2013.01); *E04F 13/0803* (2013.01); *E04F 13/0894* (2013.01); *E04F 13/12* (2013.01); *F16B 5/0016* (2013.01); *F16B 5/121* (2013.01); *F16B 5/126* (2013.01)

(58) Field of Classification Search
CPC .............. E04F 13/0801; E04F 13/0803; E04F 13/0894; E04F 13/12; F16B 5/0016; F16B 5/121; F16B 5/126
See application file for complete search history.

(56) References Cited

U.S. PATENT DOCUMENTS 2,044,216 A  *  6/1936  Klages ............................ 52/774
2,642,968 A  *  6/1953  Roush et al. .................... 52/520
2,820,535 A     1/1958  Hutchison
(Continued)

FOREIGN PATENT DOCUMENTS

CA            1138172        12/1982
CA            2409831         4/2004
WO       WO 2011091518 A1  *  8/2011

OTHER PUBLICATIONS

Supplementary European Search Report and Written Opinion for corresponding Application No. 12779986.4 dated Oct. 23, 2014 (8 pages).*

(Continued)

*Primary Examiner* — Rodney Mintz
(74) *Attorney, Agent, or Firm* — Benoît & Côté Inc.

(57) ABSTRACT

The present document describes a fastening device for fastening siding sheets to a surface, each one of the siding sheets comprising a first end, a second end and a projection portion, the fastening device comprising a strip for attachment to the surface; and braces spaced along the strip, at least one of the braces for engaging the first end of one of the siding sheets, wherein while fastening the one of the siding sheets to the surface, the second end of the one of the siding sheets is secured in place, then the first end of the one of the siding sheets is engaged in at least one of the braces.

15 Claims, 16 Drawing Sheets

(51) Int. Cl.
*F16B 5/00* (2006.01)
*F16B 5/12* (2006.01)

(56) References Cited

U.S. PATENT DOCUMENTS

| | | | | |
|---|---|---|---|---|
| 2,877,879 A * | 3/1959 | Johnson | | 52/546 |
| 3,131,513 A | 5/1964 | Grigas et al. | | |
| 3,236,932 A * | 2/1966 | Grigas et al. | | 52/543 |
| 3,596,420 A * | 8/1971 | Ducker | | 52/169.12 |
| 3,662,510 A * | 5/1972 | Leddy | | 52/748.11 |
| 3,707,821 A * | 1/1973 | Leddy | | 52/748.11 |
| 3,780,483 A * | 12/1973 | Mattes | | 52/550 |
| 3,903,670 A * | 9/1975 | Robinson, Jr. | | 52/478 |
| 4,134,244 A * | 1/1979 | Sjolander | | 52/506.1 |
| 4,288,958 A * | 9/1981 | Chalmers et al. | | 52/478 |
| 4,292,781 A * | 10/1981 | Chalmers et al. | | 52/547 |
| 4,961,295 A * | 10/1990 | Kosch et al. | | 52/36.5 |
| 5,150,555 A * | 9/1992 | Wood | | 52/544 |
| 6,044,609 A * | 4/2000 | Kim | | 52/551 |
| 6,098,363 A * | 8/2000 | Yaguchi | | 52/385 |
| 6,367,220 B1 * | 4/2002 | Krause et al. | | 52/512 |
| 6,725,618 B2 * | 4/2004 | Albracht | | 52/489.1 |
| 7,464,511 B2 * | 12/2008 | Kosch | | 52/520 |
| 8,096,091 B2 * | 1/2012 | Cristina | | 52/551 |
| 8,615,951 B2 * | 12/2013 | Kosch | | 52/520 |
| 2006/0213142 A1 * | 9/2006 | Albracht | | 52/543 |
| 2012/0292474 A1 * | 11/2012 | Deschênes | | 248/309.1 |
| 2015/0082728 A1 * | 3/2015 | Peck et al. | | 52/520 |

OTHER PUBLICATIONS

PCT—International Search Report (ISR)—PCT/CA2012/000414 (Form PCT/ISA/210)—Jul. 24, 2012—3 pages.

* cited by examiner

ATTACHMENT DEVICE FOR SHEET TYPE CONSTRUCTION SIDING

CROSS-REFERENCE TO RELATED APPLICATIONS

This application claims priority from U.S. provisional patent application 61/482,024, filed on May 3, 2011.

BACKGROUND (a) Field

This description relates to the field of construction materials. More particularly, this description relates to fasteners for fastening sheet type construction siding to a surface of a building.

(b) Related Prior Art

Usually, building sidings are made of an alignment of siding sheets laterally joined to cover a side or a portion of a side of a building. Siding sheets can be made of metal, plastics or other composite materials. Siding sheets are designed for protection of the exterior of a building while acting as a design element. Siding sheets can be disposed at any angle with respect to the ground.

Traditionally, siding sheets are perpendicularly nailed to studs disposed on the wall. Two or more workers are necessary to position a siding sheet and to nail it. Most often, especially for genuine siding sheets, nails are used to install the sheets using a manual hammer. A pneumatic or electrical hammer will often split the sheet. Also, sheets must be parallel to each other, so a line must be drawn on the wall regularly to keep them all level. Moreover, ends of a sheet must be cut to correspond to a stud.

Some systems allow nailing additional individual pieces to walls by pneumatic or electrical hammer. Each additional piece has to be nailed individually and gradually as the installation of the siding sheets progresses. These pieces must also be individually aligned with each other horizontally.

U.S. Pat. No. 3,131,513 (Grigas et al.) describes an apparatus for applying metallic siding. The apparatus includes a plurality of uprights provided with a series of integral or secured clips. Each clip includes a portion extending outwardly away from its upright, then extending downwardly and formed to curve inwardly and reversely, terminating in an upward direction forming a hook with an upwardly opening bight. The clip is provided with many folding sections, which are folded, bent, punch or otherwise formed inwardly and outwardly toward the upright. This configuration of the clip does not provide an optimal strength to the clip during installation of the metallic siding on the apparatus. Additionally, the clip of U.S. Pat. No. 3,131,513 may comprise a base plate that is punched forming a rearwardly extending tongue to act as the hook as previously described. This punched section also reduces the optimal strength to the clip during installation of the metallic siding on the apparatus. This reduction in rigidity resulting from the void in the base plate results in an unnecessary thickness of the base plate. Hence, holes for installation of the apparatus must be pre-drilled or punched. The apparatus cannot simply be nailed in place.

There is therefore a need for improved fasteners for fastening sheet type construction siding.

SUMMARY

It is an object of the present disclosure to provide a fastening device that overcomes or mitigates one or more disadvantages of known fasteners or at least provides a useful alternative.

Contrary to the prior art devices, the fastening device of the present disclosure provides some play in the siding sheet/brace arrangement which permit this upward movement thereby reducing the stress on the braces and permits easy installation.

Furthermore, the fact that the braces do not extend further than the projection portion of the siding sheet provides other advantages. First, the fact that the bottom end (second end) of a siding sheet is attached to the projection without the brace being involved provides an additional buffer to reduce the stress on the braces; i.e., the wind pull on the bottom end will pull on the projection portion without affecting the braces.

Second, the fact that the braces do not extend to the projection portion leaves some space between the first end of the siding sheet and the projection portion for a nailing strip. In fact, the configuration of the braces of the present disclosure permits the use of certain conventional siding panels which have such a nailing strip without modification or with minimal modification thereto.

Another advantage over the prior art of having shorter braces as in the present design for the fastening device is that, in the prior art, if the wind pulls on the bottom end of the siding sheet (or otherwise during installation), thereby pulling on the braces, the braces will be displaced away from the installation surface (such as during installation), thereby increasing the chances that the siding sheet will detach or disengage from the brace. The fact that in an embodiment of the present design provides a shorter brace and a hook portion which returns upwardly from the lowest point ensures that this situation is avoided; i.e., the first end of the siding sheet is well secured in the brace.

Another advantage over the prior art is to provide a brace which includes folds only toward the strip to provide an optimal strength to the clip during installation of a siding sheet on the fastening device. Also, an advantage over the prior art is to provide a brace that, with its configuration, provide an optimal strength to the brace during installation, thus resulting in an improvement in the rigidity of the brace on the fastening device and in the ability to attach the fastening device using pneumatic nailing tools or a hammer with nails anywhere in the strip; i.e., without using pre-drilled or punched holes.

According to an embodiment, there is provided a fastening device for fastening siding sheets to a surface, each one of the siding sheets comprising a first end, a second end and a projection portion between the first end and the second end, the fastening device comprising: a strip for attachment to the surface; and braces spaced along the strip and extending outwardly and downwardly therefrom to a lowest point, at least one of the braces for engaging the first end of one of the siding sheets, the braces each comprising a hook portion, a flexible portion and an abutment portion, the hook portion extending from the flexible portion and the abutment portion extending from the lowest point toward the surface, wherein while fastening the one of the siding sheets to the surface, the second end of the one of the siding sheets is secured in place, then the first end of the one of the siding sheets is pushed against the abutment of the at least one of the braces to displace the hook portion away from the surface until the first end of the one of the siding sheets is engaged in the hook portion thereby fastening the one of the siding sheets to the surface; wherein the braces comprise a reinforcement section on at least one of: the hook portion, the flexible portion and the abutment portion for reinforcing the braces while fastening the siding sheets to the surface.

According to another embodiment, the braces are regularly spaced along the strip.

According to another embodiment, the braces are irregularly spaced along the strip.

According to another embodiment, the braces comprise two braces to form a union part to join two siding sheets in an end-to-end relationship.

According to another embodiment, the strip and braces are made from the same piece of material and form a single unitary part.

According to another embodiment, the braces are cutout and folded from the same piece of material, the braces thereby comprising folds only toward the strip.

According to another embodiment, the folds comprise at least two folds, namely a first fold and a second fold.

According to another embodiment, the flexible portion is comprised between the first and the second folds.

According to another embodiment, a distance between the first and the second folds is greater than a distance between any consecutive folds thereafter or than a length of material on the braces after a last fold thereby ensuring that the flexible portion will flex to displace the hook portion.

According to another embodiment, the same unitary piece of material comprises steel, aluminum, plastic, vinyl, composite material or any combination thereof.

According to another embodiment, the abutment portion extends from the hook portion.

According to another embodiment, the abutment portion forms part of the hook portion.

According to another embodiment, the strip comprises a portion for being perforated by nails for fixing the strip on the surface.

According to another embodiment, the strip comprises markings or holes disposed at a fixed longitudinal distance of each brace for facilitating the positioning of the fastening device on the surface.

According to another embodiment, the strip has a longitudinal direction and the markings or holes comprise pairs of markings or holes wherein the markings or holes in each of the pairs of markings or holes form a line that is perpendicular to the longitudinal direction of the strip.

According to another embodiment, the strip has a longitudinal direction and the braces have a width in a direction which is perpendicular to the longitudinal direction of the strip and wherein the first end of the one of the siding sheets is parallel to a longitudinal direction of the one of the siding sheets, the longitudinal direction of the strip and the longitudinal direction of the siding sheets are therefore generally perpendicular to each other.

According to another embodiment, the strip is for vertical attachment to the surface while the siding sheets are for horizontal installation.

According to another embodiment, the fastening device may further comprise an outward extension extending from the strip for exerting an outward positive pressure on the siding sheets.

According to another embodiment, the strip comprises alignment supports disposed at a fixed longitudinal distance of each brace for receiving an alignment guide and facilitating the positioning of the fastening device on the surface.

According to another embodiment, the reinforcement section comprises a plurality of reinforcement sections on at least one of: the hook portion, the flexible portion and the abutment portion for reinforcing the braces while fastening the siding sheets to the surface.

According to another embodiment, there is provided a method for fastening to a surface, siding sheets comprising a first end, a second end and projection portion, the method comprising: installing, on the surface and at the same level, identical longitudinal fastening devices each comprising braces; securing the second end of one of the siding sheet with the projection portion of another siding sheet along the surface and perpendicularly to the longitudinal fastening devices; pushing, the first end of the siding sheet against one or more of the braces to displace the one or more of the braces away from the surface until the one or more of the braces springs back to its/their original position and the first end is engaged in the one of the braces thereby fastening the one of the siding sheets to the surface; and repeating the securing and pushing steps for another one of the siding sheets to be fastened to the projection portion of an installed siding sheet until the surface is covered.

According to another embodiment, the method may further comprise installing a starting strip on the surface in the same longitudinal direction as the intended longitudinal direction of the siding sheets, and wherein the installing the identical longitudinal fastening devices comprises leaning a bottom end of the identical longitudinal fastening devices against a top edge of the starting strip during installation thereof to the surface thereby ensuring all braces on a given identical longitudinal fastening devices are aligned with the braces of other identical longitudinal fastening devices.

According to another embodiment, there is provided a fastening device for fastening siding sheets to a surface, each one of the siding sheets comprising a first end, a second end and a projection portion between the first end and the second end, the fastening device comprising: a strip for attachment to the surface; and braces spaced along the strip and extending outwardly and downwardly therefrom to a lowest point, at least one of the braces for engaging the first end of one of the siding sheets, the braces each comprising a hook portion, a flexible portion and an abutment portion, the hook portion extending from the flexible portion and the abutment portion extending from the lowest point toward the surface, wherein while fastening the one of the siding sheets to the surface, the second end of the one of the siding sheets is secured in place, then the first end of the one of the siding sheets is pushed against the abutment of the at least one of the braces to displace the hook portion away from the surface until the first end of the one of the siding sheets is engaged in the hook portion thereby fastening the one of the siding sheets to the surface; wherein the braces are cutout and folded, the braces thereby comprising folds, the folds being only toward the strip.

According to another embodiment, there is provided an assembly comprising: a plurality of siding sheets fastened to a surface, each one of the siding sheets comprising a first end, a second end and a projection portion between the first end and the second end; and a plurality of fastening devices attached to the surface, each one of the fastening devices including: a strip attached to the surface; and braces spaced along the strip and extending outwardly and downwardly therefrom to a lowest point, at least one of the braces engaging the first end of one of the siding sheets, the braces each comprising a hook portion, a flexible portion and an abutment portion, the hook portion extending from the flexible portion and the abutment portion extending from the lowest point toward the surface; wherein the second end of the one of the siding sheets is secured in place with the projection portion of a previously installed siding sheet or of a previously installed starting strip, and the first end of the one of the siding sheets is secured in place with the plurality of braces.

According to an embodiment, the plurality of fastening devices are in a direction perpendicular to the direction of the plurality of siding sheets.

According to another embodiment, the plurality of fastening devices are for a vertical attachment to the surface and wherein the plurality of siding sheets are for an horizontal attachment to the surface.

Features and advantages of the subject matter hereof will become more apparent in light of the following detailed description of selected embodiments, as illustrated in the accompanying figures. As will be realized, the subject matter disclosed and claimed is capable of modifications in various respects, all without departing from the scope of the claims. Accordingly, the drawings and the description are to be regarded as illustrative in nature, and not as restrictive and the full scope of the subject matter is set forth in the claims.

BRIEF DESCRIPTION OF THE DRAWINGS

Further features and advantages of the present disclosure will become apparent from the following detailed description, taken in combination with the appended drawings, in which.

It will be noted that throughout the appended drawings, like features are identified by like reference numerals.

DETAILED DESCRIPTION

Figure 1:
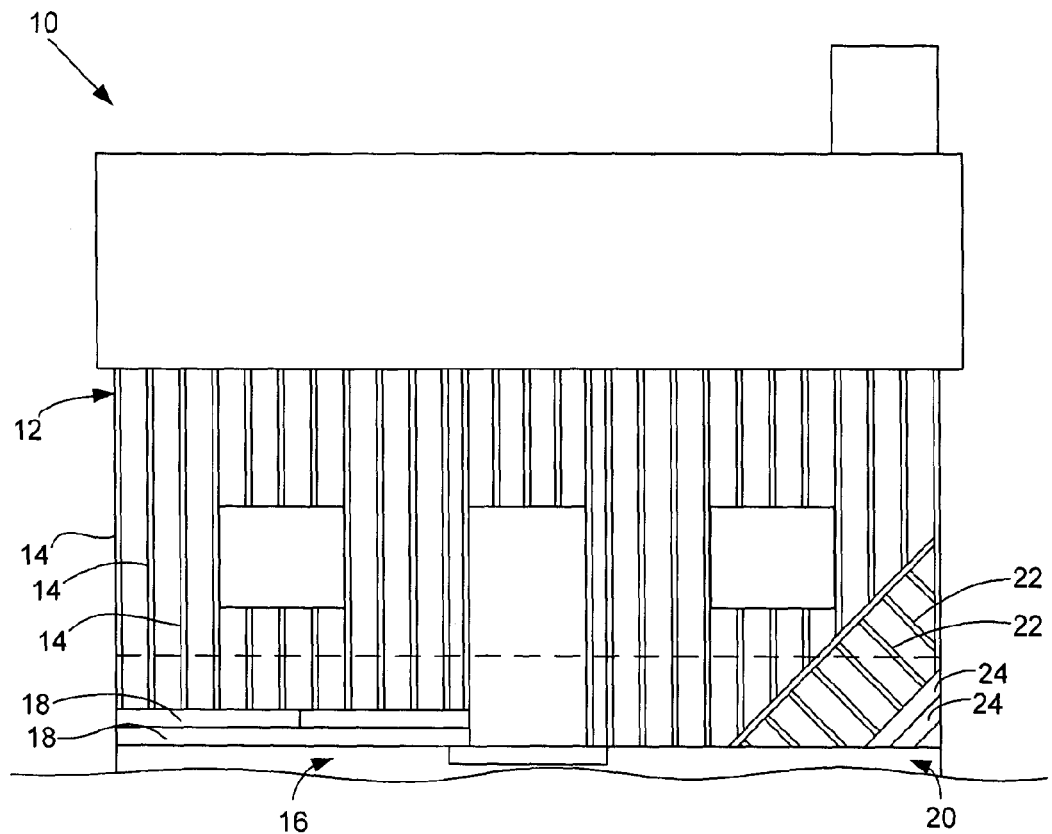
FIG. 1 is a front elevation view of a house partially covered with siding sheets in accordance to an embodiment.

Referring now to the drawings, and more particularly to FIG. 1, there is shown a building 10 having an outside surface 12 covered with parallel strapping 14 regularly or irregularly fixed on the surface 12. On the lower left part 16 of the surface 12, siding sheets 18, such as plastic siding sheets or metallic siding sheets, are horizontally fastened to strapping 14. On the lower right part 20 of the surface 12, strapping 22 are shown inclined with respect to the ground. It will be shown that siding sheets 24 are installed perpendicularly to the strapping 22.

Figure 2:
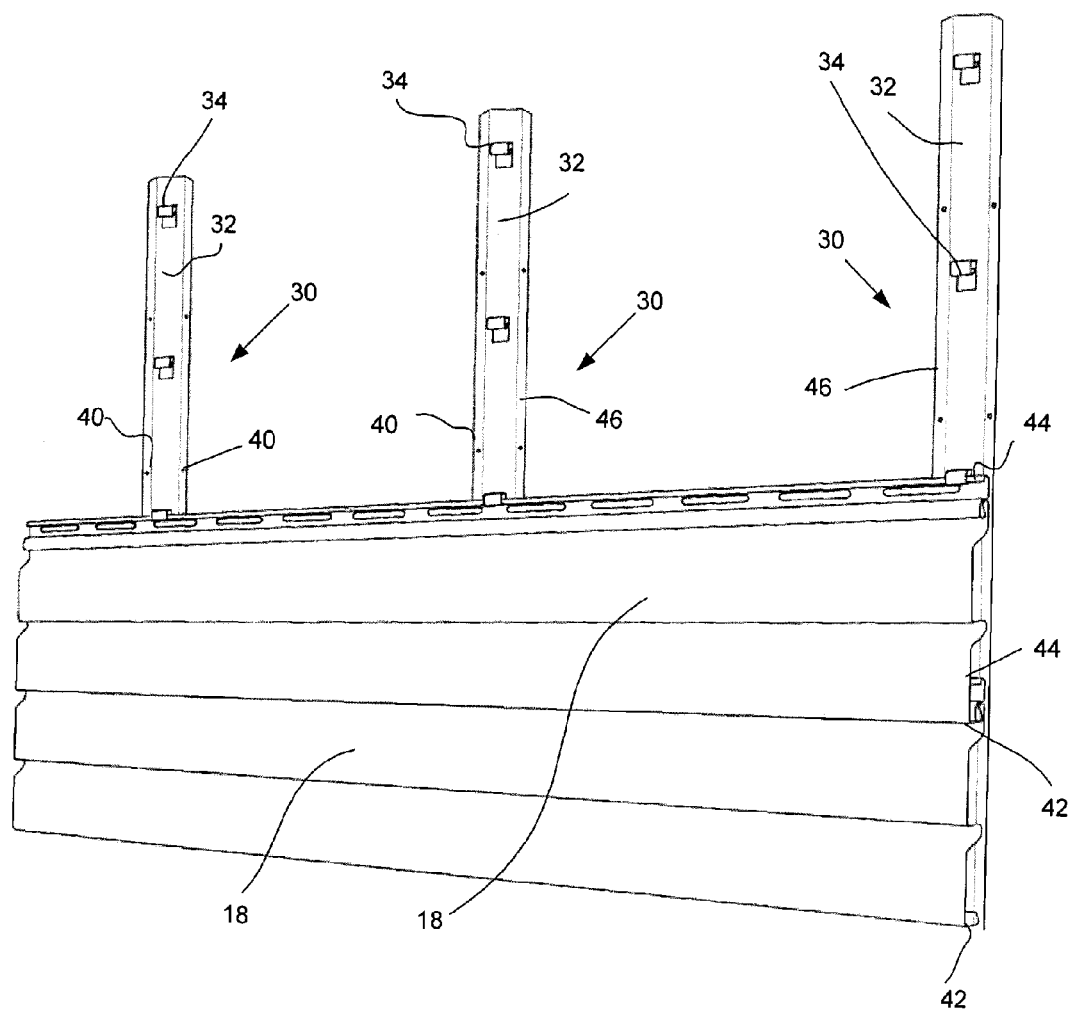
FIG. 2 is a partial view of siding sheets fastened to a surface in accordance to another embodiment.
Figure 3:
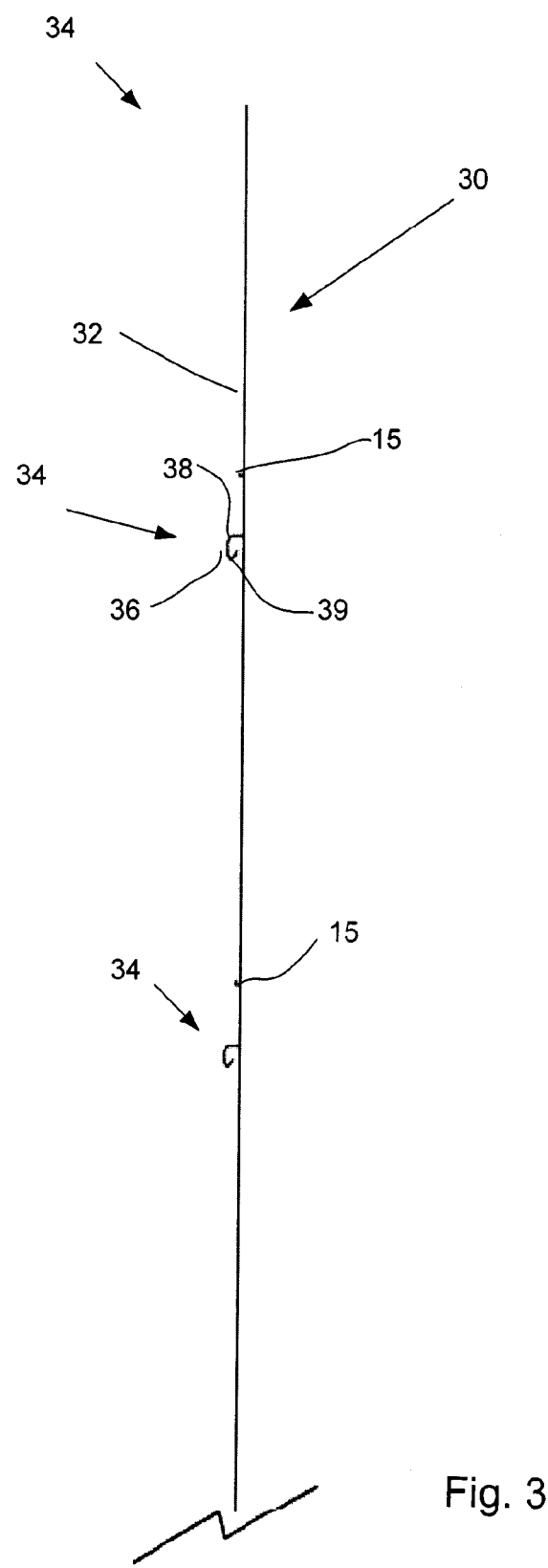
FIG. 3 is a side view of the fastening device of FIG. 2.

FIG. 2 illustrates a structure with fastening devices 30. As shown in FIGS. 2, 2B and 3, there is shown a fastening device 30 for fastening siding sheets 18 to a surface 12 (FIG. 1).

The fastening device 30 also includes ridges 46 (FIG. 2) for exerting a positive outward pressure on the siding sheets 18 once installed. The positive outward pressure may also be exerted on the siding sheet 18 using other means such as cut-out extensions (not shown) similar to braces 34. All positive pressure means, such as ridges 46, act to provide an air space behind the siding sheets 18.

According to an embodiment, the fastening device 30 is made of rigid material such as sheet metal comprising steel. The fastening device 30, shown in FIGS. 1 to 3, is meant to be installed on strapping 14 or strapping 22 of FIG. 1. The fastening device 30 can be installed to strapping 14 or 22 using nails installed by hand or using a pneumatic gun. Any other means for fixing fastening device 30 to strapping 14 or 22 such as screws, glue, double-side or single-side tape, etc., or any combination thereof is acceptable.

As shown in FIGS. 2 and 3, on the fastening device 30, braces 34 are regularly or irregularly disposed along the strip 32. As shown in FIG. 2B, each brace 34 has a flexible portion 38 and a hook portion 36 that extends from the flexible portion 38. The brace also comprises an abutment portion 39 located above the lowest point of the brace. Each portion is for engaging one end of siding sheets 18 as shown in more detail in FIG. 5. The strip 32 further comprises a plurality of markings 40 (FIG. 2), each disposed at a fixed longitudinal distance from a brace 34. Each marking 40 acts as a visual indicator to facilitate the positioning of the fastening device 30 on the surface 12.

It is to be noted that the braces 34 may be cutout and folded. Thus, the braces 34 comprise folds which are only toward the strip 32.

A person skilled in the art will understand that the function of the markings 40 may be implemented by other means than those shown in FIG. 2. For example, there could only be one bore between each brace 34. The markings 40 could also be replaced by any type of marking, such as a line, a dot or dots, bores, etc., as long as it is disposed at a fixed longitudinal distance from a brace 34.

Figure 4:
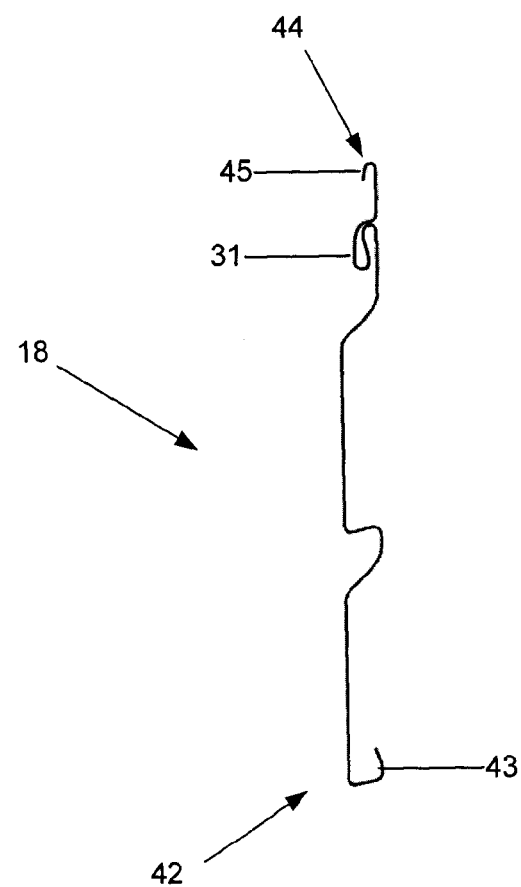
FIG. 4 is a side view of the siding sheet of FIG. 2.

Now referring to FIG. 4, there is shown a side view of a siding sheet 18 according to an embodiment. The siding sheet 18 includes a first end 44, a second end 42 and a projection portion 31.

There is also shown the bottom back hook 43 of the second end 42 and a front top hook 45 of the first end 44, which are normally found on siding sheets 18. Bottom back hook 43 of the second end 42 and front top hook 45 of the first end 44 function as they would normally in that, bottom back hook 43 of the second end 42 of a siding sheet 18 for installation above an installed lower siding sheet 18 is made to interact with front top hook 45 of the first end 44 of the installed lower siding sheet 18. Front top hook 45 of the first end 44 is made to interact with hook portion 36 to hold the top portion of the siding 18 to the strip 32 and hence to strapping 14 of FIG. 1.

Figure 5:
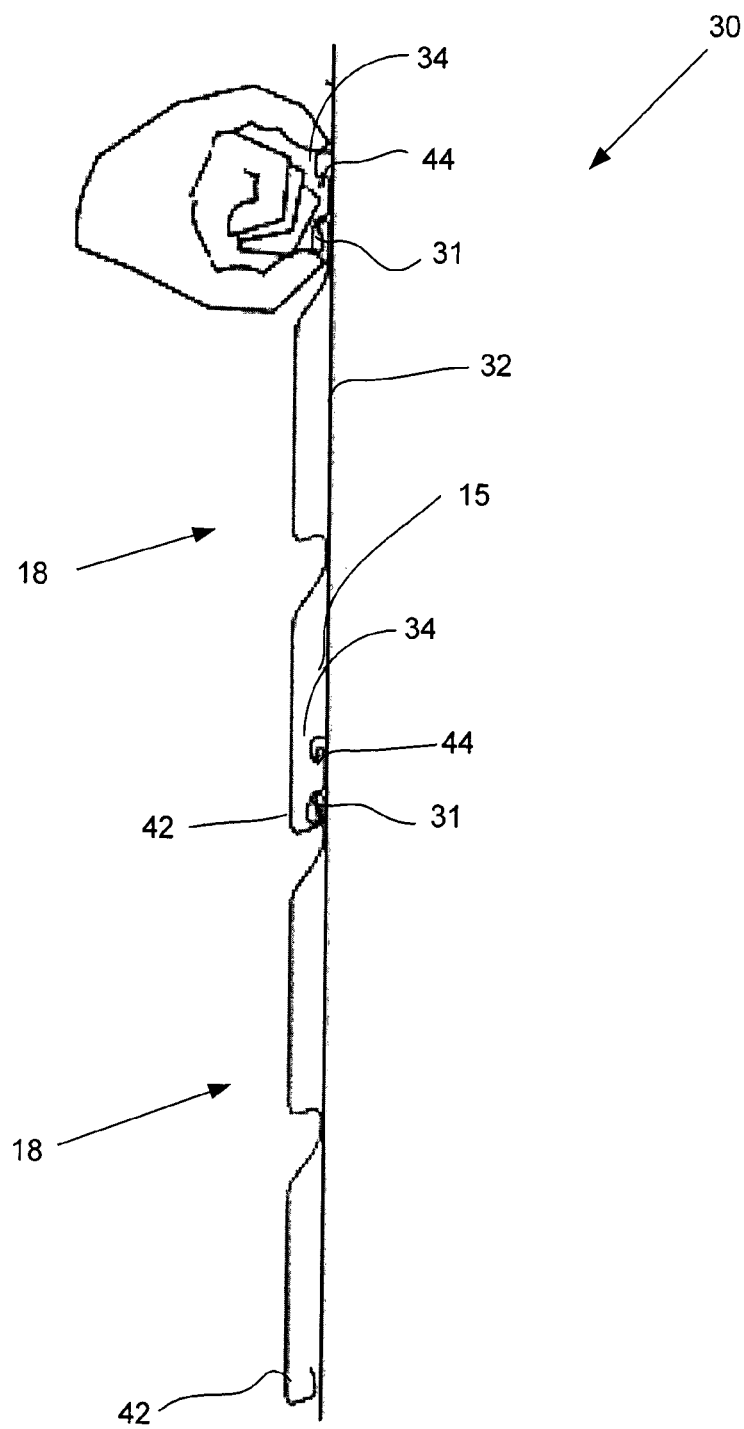
FIG. 5 is a side view of siding sheets fastened to a surface by the fastening device of FIG. 2.
Figure 6:
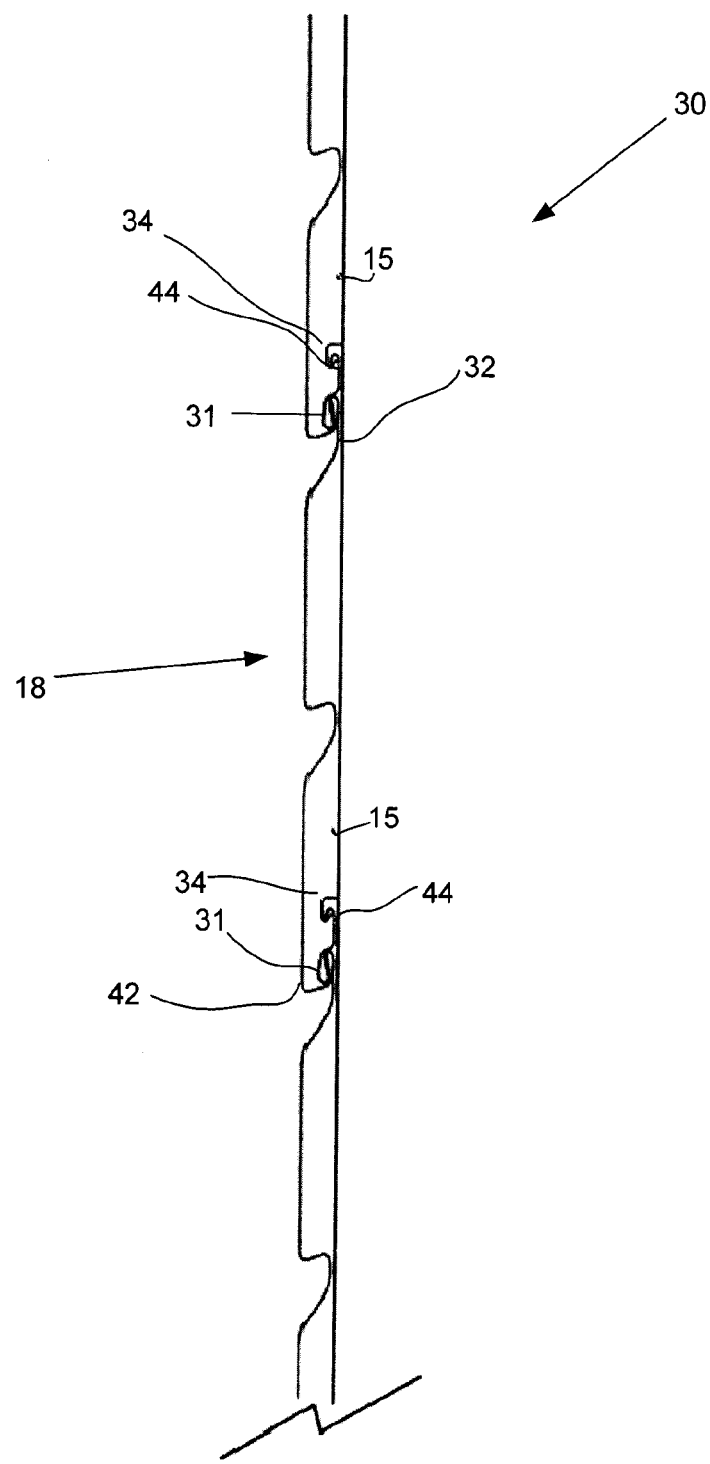
FIG. 6 is a side view of siding sheets fastened to a surface by the fastening device of FIG. 2.

Now referring to FIGS. 5 and 6, there is shown a side view of siding sheets 18 fastened to a surface by the fastening device 30. During the fastening of the siding sheet 18 to the surface 12 (FIG. 1), the second end 42 of the siding sheet 18 is secured in place with the projection portion 31 of another siding sheet 18, then the first end 44 of the siding sheet 18 is pushed against the brace 34 to displace the hook portion 36 (FIG. 3) away from the surface 12 of the siding sheets 18 until the brace 34 springs back to its original position and the first end 44 of the siding sheet 18 is engaged in the hook portion 36 thereby fastening the one of the siding sheets 18 to the surface 12.

In FIG. 5, the bottommost siding sheet 18 is shown installed. In this embodiment, the flexible portion 38 (FIG. 2B) of a brace 34 engages and secures the first end 44 of a siding sheet 18.

Still referring to FIG. 5, the topmost siding sheet 18 is shown ready to be installed with its second end 42 in place on the projection portion 31 of the bottommost siding sheet 18 while the first end 44 is pushing against the brace 34.

Figure 8:
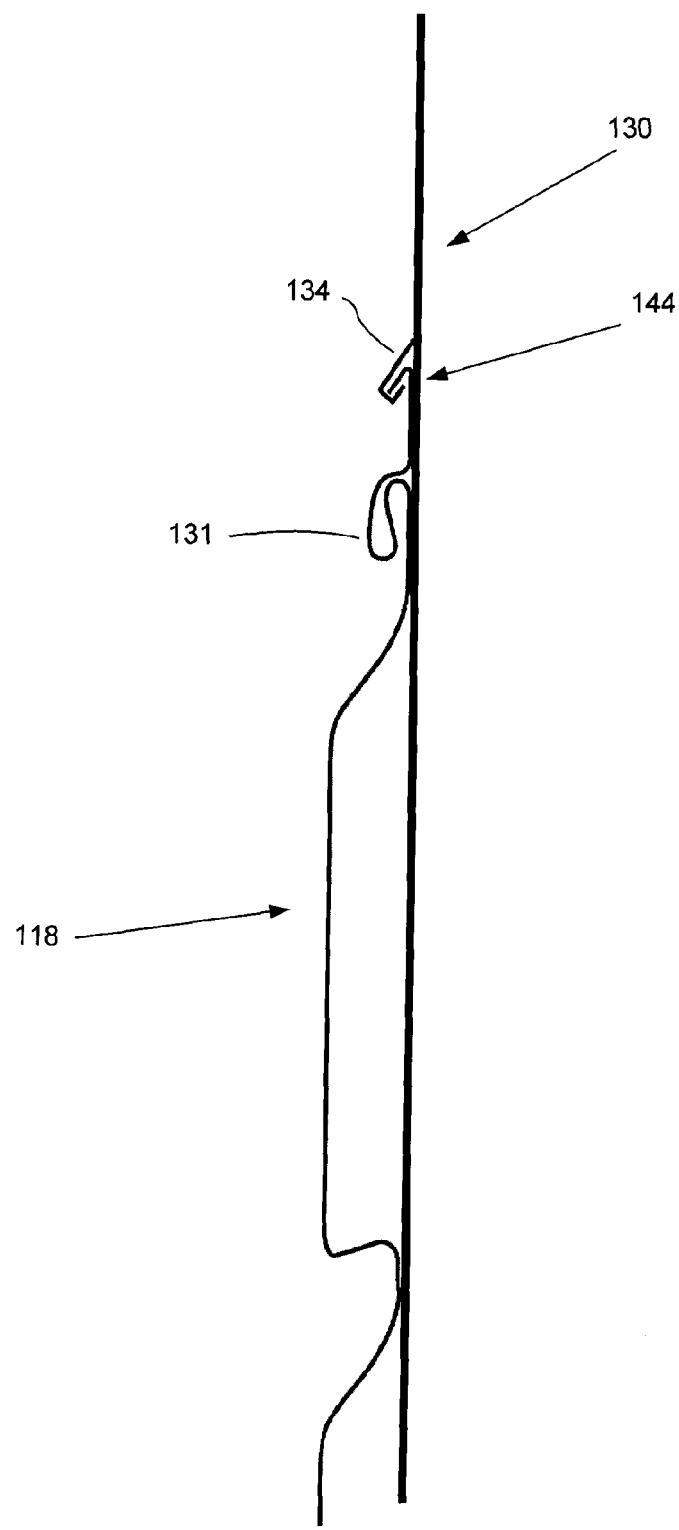
FIG. 8 is a side view of a siding sheet fastened to a surface by the fastening device according to another embodiment.
Figure 9:
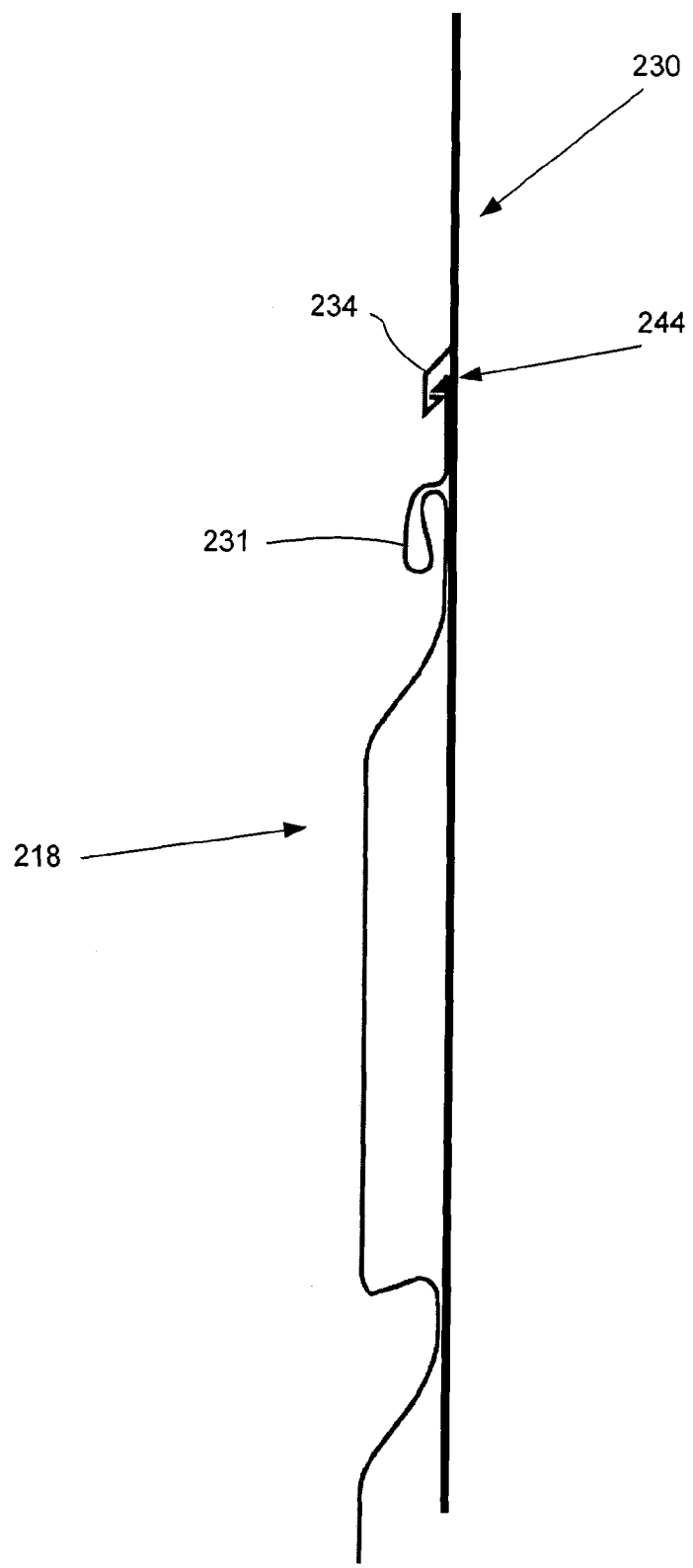
FIG. 9 is a side view of siding sheet fastened to a surface by the fastening device according to another embodiment.

Although a given profile for the siding sheets 18 is shown in FIGS. 5 and 6, many other profiles which will work well are possible (see FIGS. 8 and 9). Indeed, braces 34, 134 and 234 may take different shapes. Also, siding sheets 18, 118 and 218 may respectively take on different forms to provide different embodiments for the fastening devices 30, 130 and 230. The siding sheets 18, 118 and 218 include a projection portion 31, 131 and 231 that may take different shapes. The same can be said about the particular shape of the braces as long as the braces 34, 134 and 234 properly interact with the first end of the siding sheets respectively 18, 118 and 218. The distance between braces 34, 134 and 234 corresponds respectively to the distance between the first ends 44, 144 and 244 and the second ends of each siding sheets 18, 118 and 218 minus a distance equivalent to that between the first ends 44, 144, 244 and projection portions 31, 131 and 231 respectively; said another way, the distance between braces 34, 134 and 234 corresponds respectively to the distance between the second ends of each siding sheets 18, 118 and 218 and the projection portions 31, 131 and 231.

It should be noted that fastening device 30 may be made of various materials such as metal, steel, aluminum, plastic, vinyl, composite material etc.

Installation of siding sheets 18 on a surface using the fastening device 30 is much easier and faster that using prior art techniques and devices.

Referring to FIG. 6, there is shown a fastening device 30 comprising a strip 32. The fastening device 30 is made of rigid material such as sheet metal comprising steel. The fastening device 30 is meant to be installed on strapping 14 or strapping 22 of FIG. 1. The fastening device 30 can be installed to strapping 14 or 22 using nails installed by hand or using a pneumatic gun. Any other means for fixing fastening device 30 to strapping 14 or 22 such as screws, glue, double-side or single-side tape, etc., or any combination thereof is acceptable.

Still referring to FIG. 6, there is shown a side view of a plurality of siding sheets 18 fastened to a surface by the fastening device 30.

On the fastening device 30, braces 34 are regularly disposed along the strip 32. Each brace 34 has a hook portion 36 (FIG. 2B). Each hook portion 36 is for engaging a corresponding top back hook portion of the first end 44 of the siding sheet 18.

Figure 7:
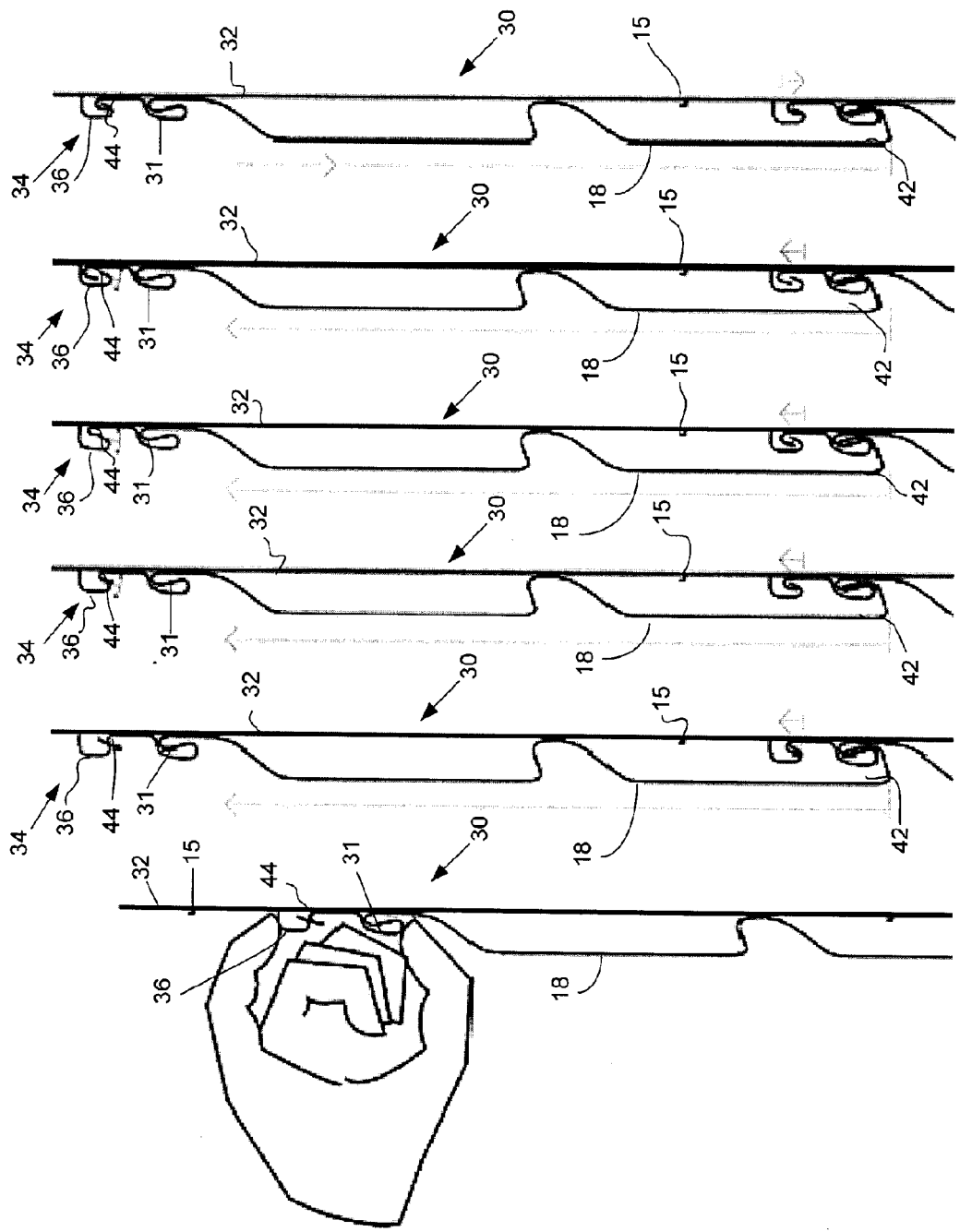
FIG. 7 is a side view of the fastening devices at different steps of a method for fastening siding sheets to a surface according to an embodiment.

Now referring to FIG. 7, according to an embodiment, the user uses a known method for fastening siding sheets 18 to a surface 12. The user may use a set of markings 40 from the fastening device 30 as a reference to level all the fastening devices 30 (see FIG. 2). One of the steps may include using a chalk line with a regular level or a laser level.

According to an embodiment, the strip 32 may comprise alignment supports 15 disposed at a fixed longitudinal distance of each brace 34 for receiving an alignment guide and facilitating the positioning of the fastening device 30 on the surface 12.

The selected height may be determined by where the user wants a given siding sheet 18 to be located relative to a part of the surface; i.e., the top or the bottom of the surface, an opening in the surface, etc. Then, the fastening devices 30 are installed. All markings 40 should form level horizontal lines since all fastening devices 30 are identical.

Then, a first fastening device 30 is installed at a selected height. Once the surface is marked with a level horizontal line crossing one of the sets of markings 40, the user installs a fastening device 30 on all, or a majority of, the remaining strapping 14 with a set of markings 40 from each fastening device 30 crossing the horizontal line. Having all sets of markings 40 at the same relative distance from a respective brace 34 ensures that all braces form level horizontal lines. Using a nail gun for installing the fastening device 30 to the stripping is particularly useful.

The user then starts installing siding sheets 18 starting at the bottom of the surface and then moves up from there to the row of siding sheets 18 immediately above. Each siding sheet 18 is installed simply by securing or hooking the second end 42 of a siding sheet 18 to a projection portion 31 of another, previously installed, siding sheet 18. The first end 44 of the siding sheet 18 is then pushed against the row of braces 34 above it. The braces 34 are forced to move upward until the first end 44 of the siding sheet 18 crosses the hook portion 36 of the braces 34. The hook portion 36 of braces 34 will then secure the siding sheet 18 in place. The series of views from left to right in FIG. 7 shows this process.

A shown in FIG. 7 more particularly, the method for fastening siding sheets 18 to a surface comprises the steps of securing in place the second end 42 of the one of the siding sheets 18 with the projection portion 31 of another one of the siding sheets 18 and pushing against the at least one of the braces 34 the first end 44 of the one of the siding sheets 18 to displace the hook portion 36 away from the surface 12 of the one of the siding sheets 18 until the first end 44 of the one of the siding sheets 18 is engaged in the hook portion 36 thereby fastening the one of the siding sheets 18 to the surface 12.

Installing siding sheets 18 using this technique can thus be achieved by one person without using nails through the siding sheets 18.

FIG. 7 also shows that, during installation, the second end 42 of a siding sheet 18 being installed pulls up on the projection portion 31 of the siding sheet 18 below. There is thus some play provided in the siding sheet/brace arrangement which permit this upward movement. Once the siding sheet 18 is installed, it then slightly moves back down until the front hook portions 45 rests on their respective braces 34.

Figure 11:
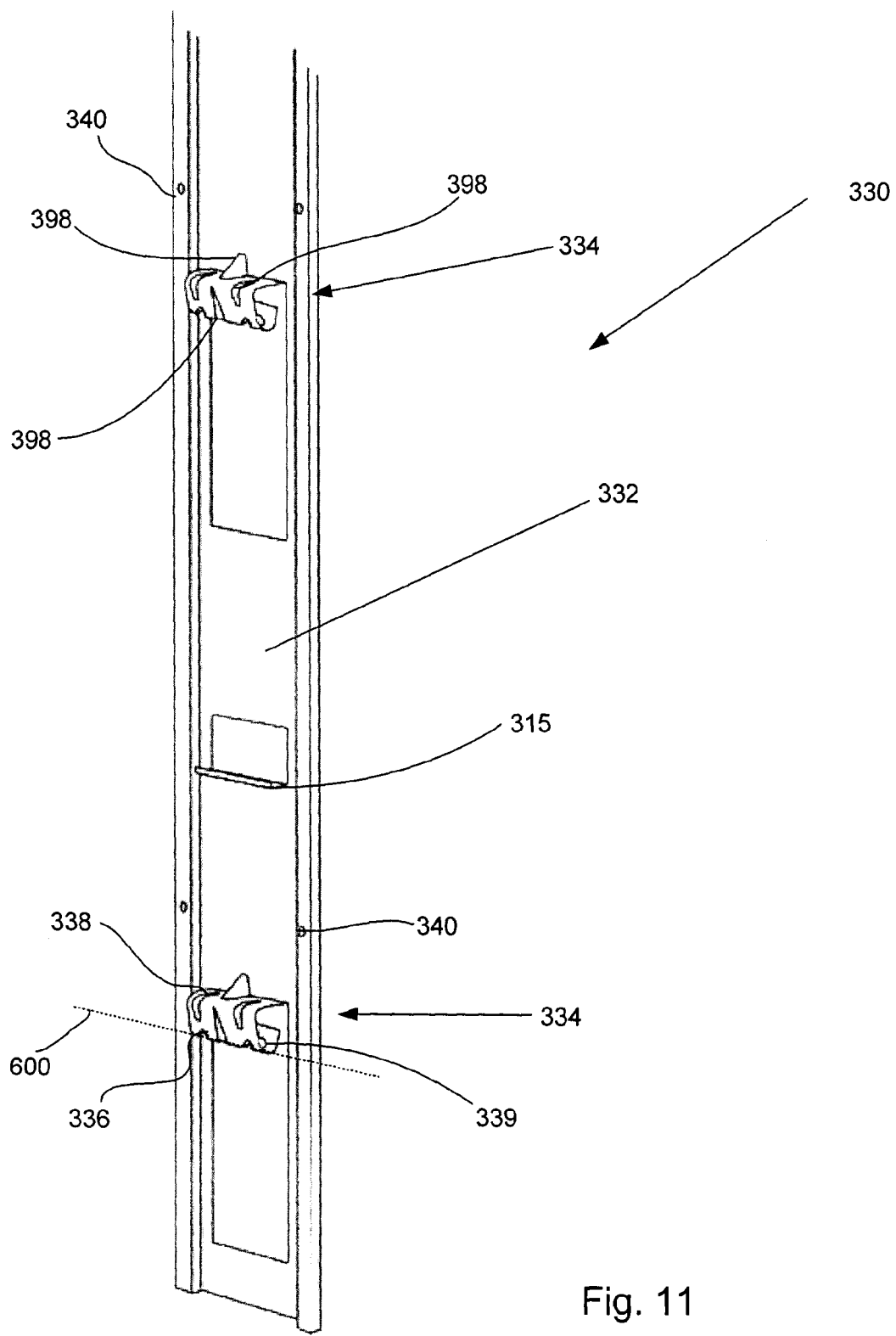
FIG. 11 is a perspective view of a fastening device according to another embodiment.
Figure 15:
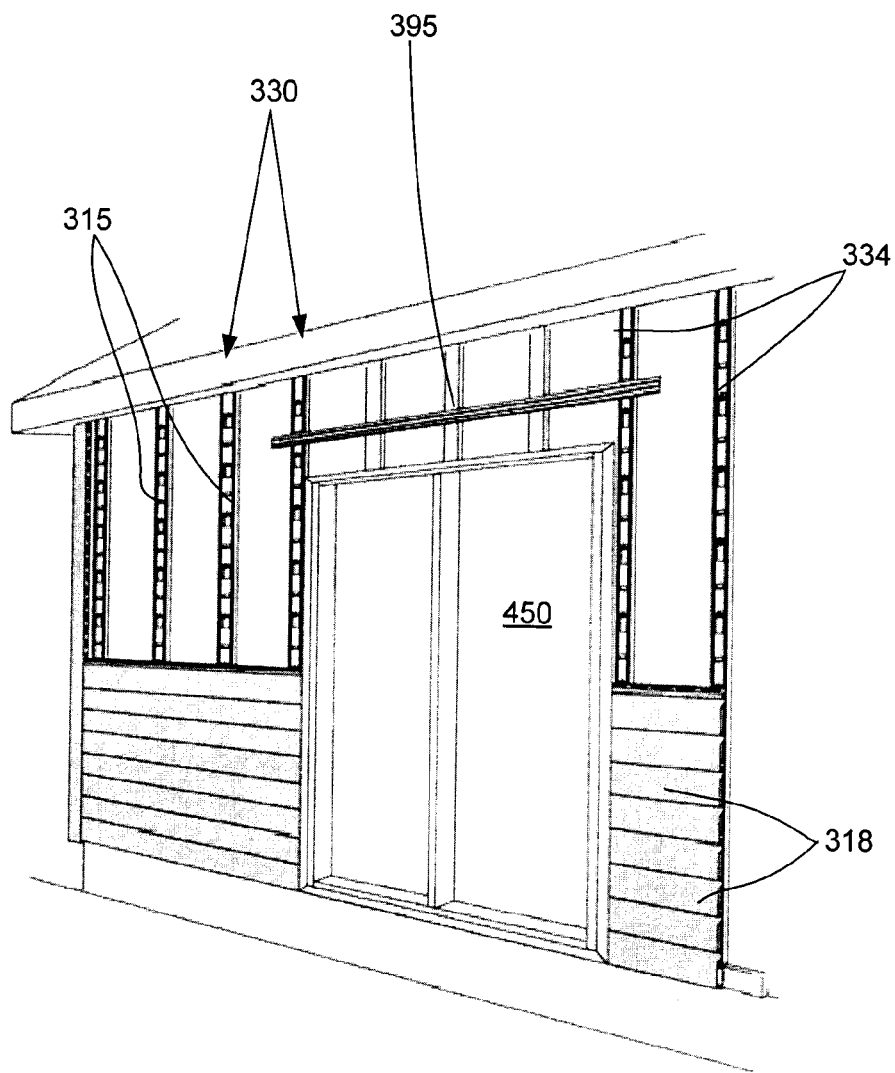
FIG. 15 is perspective view of siding sheets fastened to a surface and of an alignment guide fixed to fastening devices according to another embodiment.
Figure 16A:
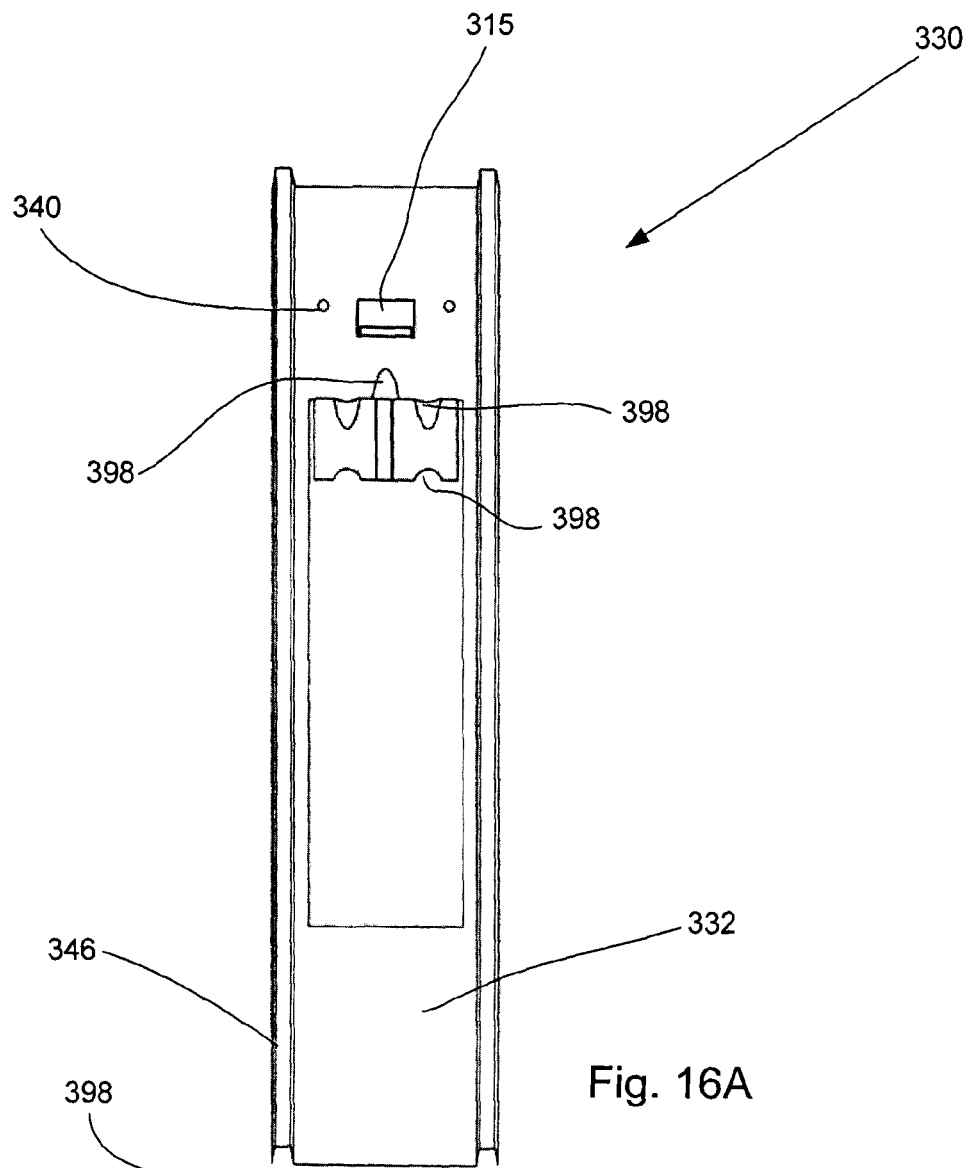
FIGS. 16A and 16B are a front elevation and top elevation views of the fastening device of FIG. 11.
Figure 16B:
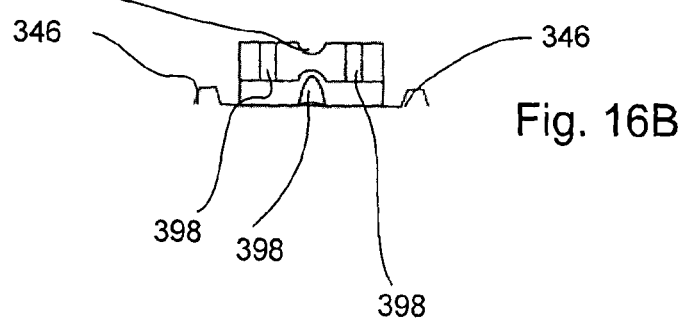

Referring now to FIGS. 11, 16A and 16B, there is shown on the fastening device 330, braces 334 which are regularly or irregularly disposed along the strip 332. As shown in FIG. 11, each brace 334 has a flexible portion 338 and a hook portion 336 that extends from the flexible portion 338. The brace 334 also comprises an abutment portion 339 located above the lowest point 600 of the brace 334. Each portion is for engaging one end of siding sheets 318 as shown in detail in FIG. 5. The strip 332 further comprises a plurality of markings or alignment holes 340, each disposed at a fixed longitudinal distance from a brace 334. Each marking or alignment hole 340 acts as a visual indicator to facilitate the positioning of the fastening device 330 on the surface 12. The strip 332 of the fastening device 330 also includes alignment supports 315 disposed at a fixed longitudinal distance of each brace 334 for receiving an alignment guide 395 (FIG. 15) which facilitated the positioning of the fastening device 330 on the surface. More particularly, the strip 332 has a longitudinal direction and the alignment supports 315 form a line that is perpendicular to the longitudinal direction of the strip 332. The braces 334 also comprise a reinforcement section 398 on at least one of: the hook portion 336, the flexible portion 338 and the abutment portion 339 for reinforcing the braces 334 while fastening the siding sheets (not shown) to the surface. It is to be noted that the reinforcement section 398 comprises a plurality of reinforcement sections 398 on at least one of: the hook portion 336, the flexible portion 338 and the abutment portion 339 for reinforcing the braces 334 while fastening the siding sheets (not shown) to the surface.

A person skilled in the art will understand that the function of the alignment supports 315 may be implemented by other means than those shown in FIG. 11.

Figure 12:
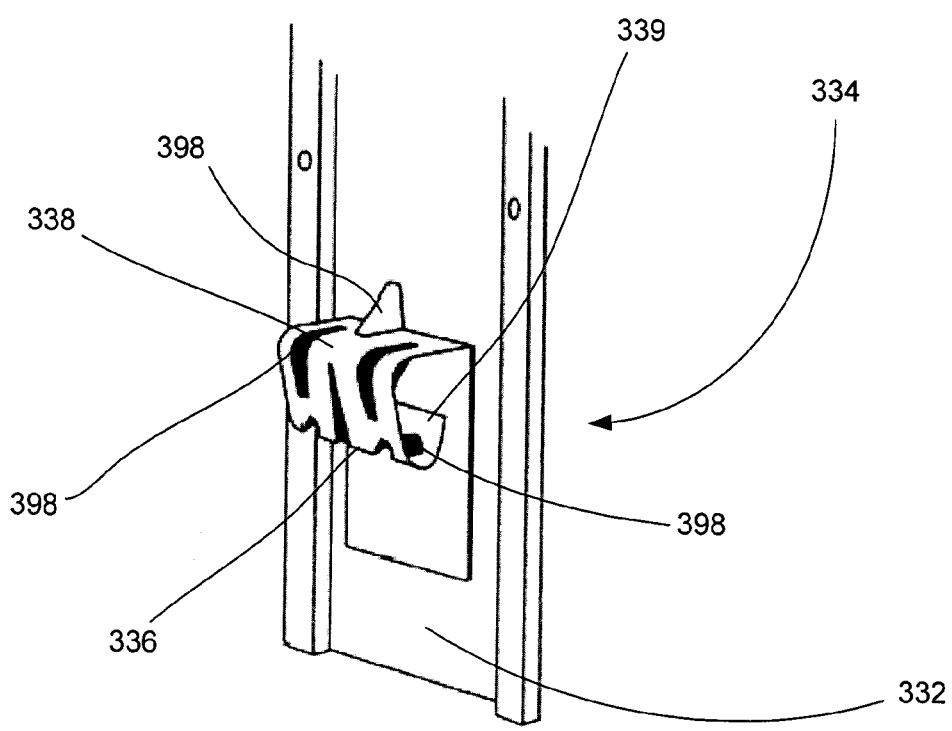
FIG. 12 is a partial close-up perspective view of a brace of the fastening device of FIG. 11.

FIG. 12 illustrates a partial close-up view of the fastening device 330 of FIG. 11. There is shown in FIG. 12 that the hook portion 336, the flexible portion 338 and the abutment portion 339 include a plurality of reinforcement sections 398 for reinforcing the braces 334 while fastening the siding sheets (not shown) to the surface.

Figure 13:
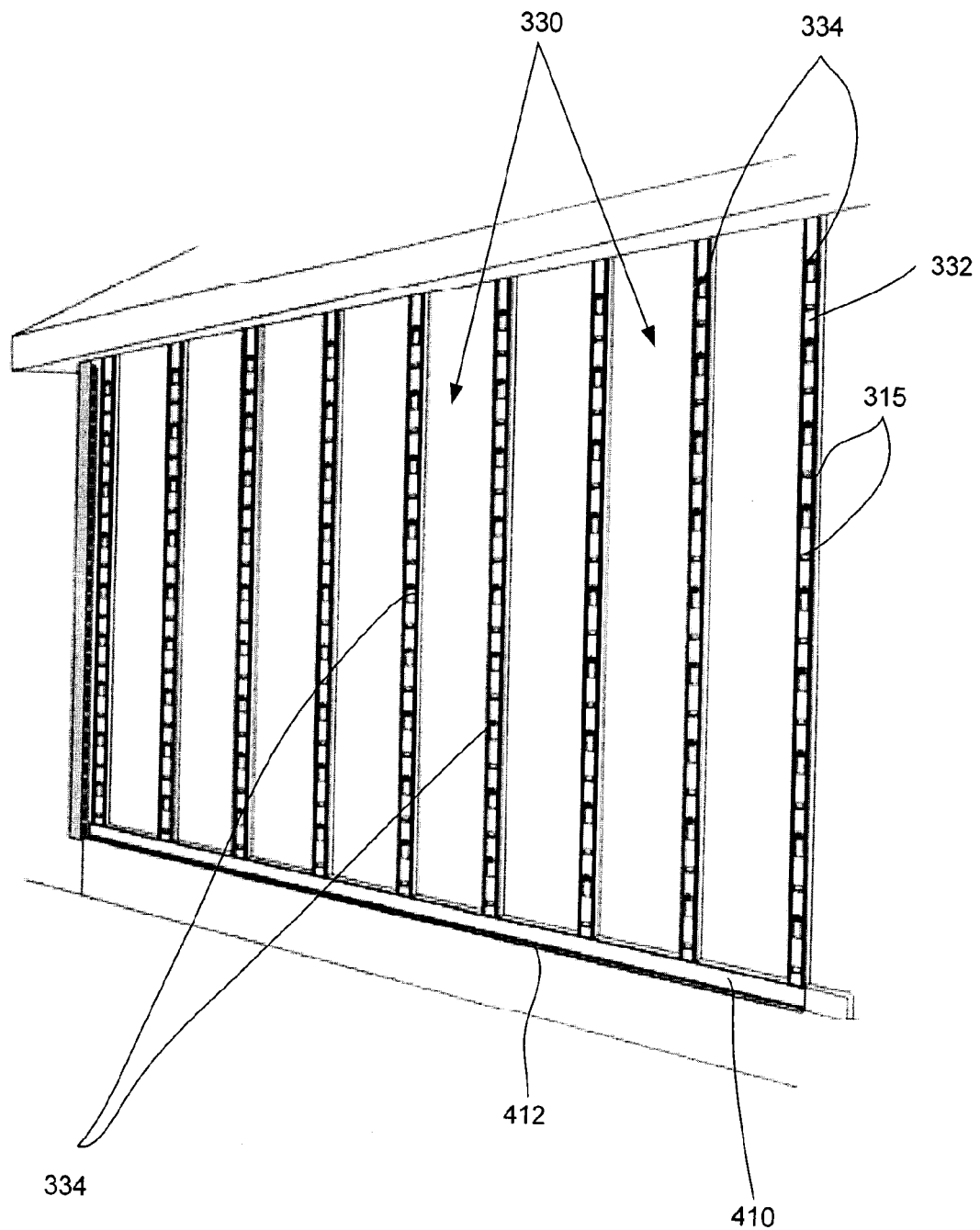
FIG. 13 is a perspective view of a plurality of fastening devices fixed to a plurality of strips according to another embodiment.
Figure 14:
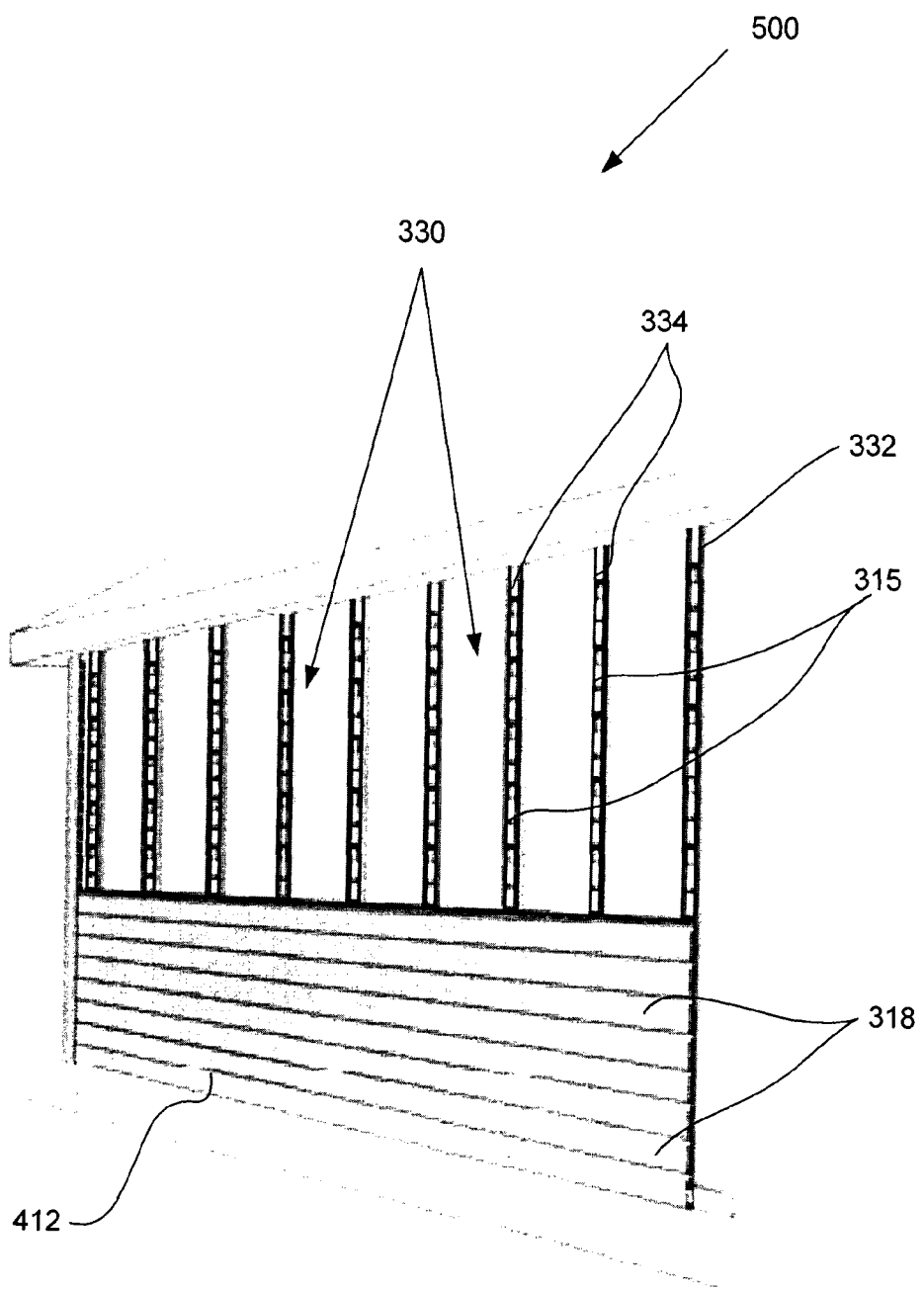
FIG. 14 is a perspective view of siding sheets fastened to a surface in accordance to another embodiment.

Now referring to FIGS. 13 and 14, there is shown a plurality of fastening devices 330 fixed to a plurality of strips according to another embodiment. As shown in FIG. 11, on the fastening devices 330, braces 334 are regularly disposed along the strips 332. As shown in FIG. 11, each brace 334 has a flexible portion 338 and a hook portion 336 that extends from the flexible portion 338. The braces 334 also comprise an abutment portion 339 located above the lowest point 600 (FIG. 11) of the braces 334. Each portion is for engaging one end of siding sheets 318.

Still referring to FIGS. 13 and 14 there is shown a starting strip 410 installed on the surface in the same longitudinal direction as the intended longitudinal direction of the siding sheets 318 (FIG. 14). The starting strip 410 has a projection portion 412, which is equivalent to the projection portion 31 (FIG. 4), for receiving the second end 42 (FIG. 4) of a first siding sheet 318 (FIG. 14) installed on the strips 332. FIG. 14 shows that a siding sheet 318 is installed using the starting strip 410 and the plurality of fastening devices 330. It is to be noted that the projection portion 412 on the starting strip 410 may upwardly project from the starting strip 410 at any longitudinal position between the opposite edges of the starting strip 410. However, the projection portion 412 needs to be at a distance to ensure that the second end 42 (FIG. 4) of a first siding sheet 318 installed on the strips 332 can be engaged in the projection portion 412 while the first end 44 (FIG. 4) of the first siding sheet 318 can engage a brace 334.

Still referring to FIG. 14, there is shown assembly of a plurality of siding sheets 318 fastened to a surface. Each one of the siding sheets 318 includes a first end 44, a second end 42 and a projection portion 31 between the first end 44 and the second end 42 (FIG. 4). The assembly 500 comprises a plurality of fastening devices 330 attached to the surface. Each one of the fastening devices 330 includes a strip 332 (FIG. 13) attached to the surface and braces 334 spaced along the strip 332. The braces 334 are extending outwardly and downwardly therefrom to a lowest point 600 (FIG. 11). At least one of the braces 334 engages the first end 44 of one of the siding sheets 318. The braces 334 each includes a hook portion 336, a flexible portion 338 and an abutment portion 339, where the hook portion 336 extends from the flexible portion 338 and the abutment portion 339 extends from the lowest point 600 toward the surface. The second end 42 of the one of the siding sheets 318 is secured in place with the projection portion 31, and the first end 44 of the one of the siding sheets 318 is secured to the at least one of the braces 334.

Referring now to FIG. 15, there is shown siding sheets 318 fastened to a surface and an alignment guide 395 removably fixed to fastening devices 330 according to another embodiment. The alignment guide 395 is removably secured to the alignment supports 315 disposed at a fixed longitudinal distance of each brace 334 of the fastening devices 330. The alignment guide 395 allows, when the surface shows obstructions or openings 450 (i.e.; doors, windows, a second floor, and the like) to ensure that the fastening devices 330 installed above these obstructions or openings 450 are perpendicular to the alignment guide 395 and to the same longitudinal direction as the intended longitudinal direction of the siding sheets 318 already installed. The alignment may be performed by simply drawing a line across the strips using the bottom or another portion of the guide 395. The fastening devices 330 can then be installed by aligning the markings or the alignment holes 340 with the line drawn across the mountings. After or before installation of the fastening devices 330 above these obstructions or openings 450, the alignment guide 395 may be removed from the alignment supports 315 and other siding sheets 318 may be installed above the obstructions or openings 450.

Figure 10:
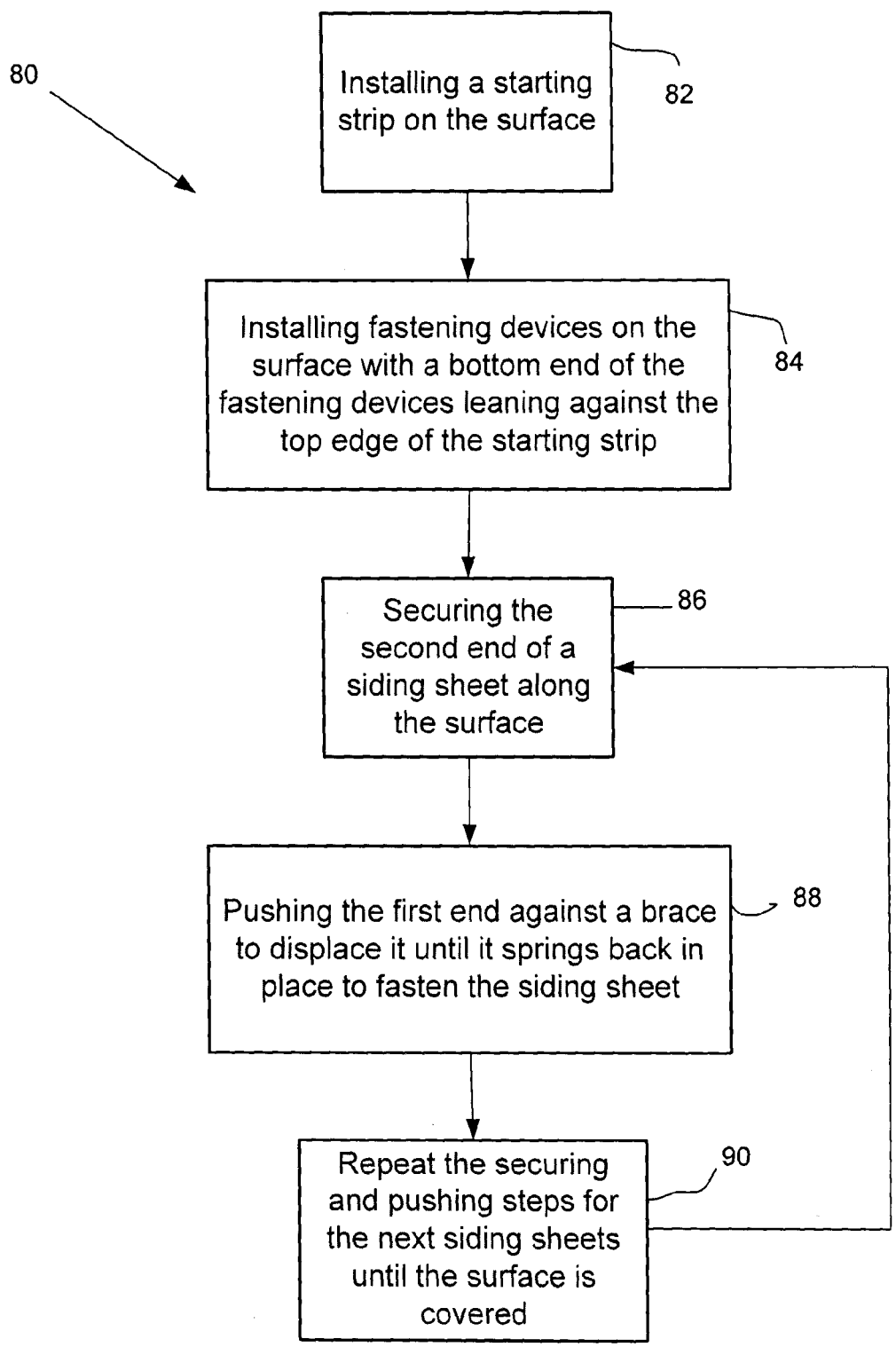
FIG. 10 is a block diagram describing an embodiment of a method for fastening siding sheets to a surface.

Back to FIG. 10, there is described an embodiment of a method 80 for fastening to a surface, siding sheets comprising a first end, a second end and a projection portion. The method 80 comprises: installing a starting strip on the surface in the same longitudinal direction as the intended longitudinal direction of the siding sheets (step 82); installing, on the surface, identical longitudinal fastening devices, each comprising braces, while leaning a bottom end of the identical longitudinal fastening devices against a top edge of the starting strip during installation of the starting strip to the surface, thereby ensuring all braces on a given identical longitudinal fastening devices are aligned with the braces of other identical longitudinal fastening devices (step 84); securing, on the starting strip, the second end of one of the siding sheets along the surface and perpendicularly to the longitudinal fastening devices (step 86); pushing, the first end of the siding sheet against one or more of the braces to displace the one or more of the braces away from the surface until the one or more of the braces springs back to its/their original position(s) and the first end is engaged in the one of the braces thereby fastening the one of the siding sheets to the surface (step 88); and repeating the securing and pushing steps for another one of the siding sheet(s) to be fastened/hooked on the projection portion of an installed siding sheet until the surface is covered (step 90).

Alternatively, steps 82, 84 and 86 are adapted for the situation where no starting strip is provided. In such a situation, a first longitudinal fastening device is installed. A line is drawn (e.g., using a chalk line) on the surface perpendicularly to the first longitudinal fastening device and crossing one of the markings thereon. Then, other longitudinal fastening devices are installed on the surface while ensuring the crossing of one of the markings of each of the longitudinal fastening device thereby resulting in the braces being perfectly aligned in rows. A portion of a siding sheet comprising at least the first end and the projection portion can then be installed using the lowermost braces and another securing means (e.g., nails, glue, screws, staples, etc.) if necessary. The method then proceeds to step 86 by securing the second end on the projection portion of the installed portion of siding sheet instead of on the starting strip. The other steps of the method are then performed as described above.

While preferred embodiments have been described above and illustrated in the accompanying drawings, it will be evident to those skilled in the art that modifications may be made therein without departing from the essence of this disclosure.

Such modifications are considered as possible variants comprised in the scope of the disclosure.

The invention claimed is:

1. A fastening device for fastening siding sheets to a substantially vertical surface, each one of the siding sheets comprising a first end, a second end and a projection portion between the first end and the second end, the fastening device comprising:
    a strip for attachment to the substantially vertical surface; and
    braces spaced along the strip and extending outwardly and downwardly therefrom to a lowest point, at least one of the braces for engaging the first end of one of the siding sheets, the braces each comprising a hook portion, a flexible portion and an abutment portion, the hook portion extending from the flexible portion and the abutment portion extending upwardly from the lowest point toward the substantially vertical surface, wherein when fastening the one of the siding sheets to the substantially vertical surface, the second end of the one of the siding sheets is secured in place independently from any of the braces, then the first end of the one of the siding sheets is pushed against the abutment portion of the at least one of the braces to displace the hook portion away from the substantially vertical surface until the first end of the one of the siding sheets is engaged in the hook portion thereby fastening the one of the siding sheets to the substantially vertical surface;
    wherein the braces comprise a reinforcement section on at least one of: the hook portion, the flexible portion and the abutment portion for reinforcing the braces when fastening the siding sheets to the substantially vertical surface;
    wherein the braces are cutout and folded from a same piece of material, the braces comprising folds, namely a first fold, between the flexible portion and the strip, and subsequent folds, wherein all of the subsequent folds are only folded toward the strip;
    wherein the strip and the braces are comprised of the same piece of material and are a continuous unitary structure of one-piece construction.

2. The fastening device of claim 1, wherein the reinforcement section is on at least two of: the hook portion, the flexible portion and the abutment portion for reinforcing the braces when fastening the siding sheets to the substantially vertical surface.

3. The fastening device of claim 1, wherein the reinforcement section comprises a plurality of reinforcement sections on at least one of: the hook portion, the flexible portion and the abutment portion for reinforcing the braces when fastening the siding sheets to the substantially vertical surface.

4. The fastening device of claim 1, further comprising an outward extension extending from the strip for exerting an outward positive pressure on the siding sheets.

5. The fastening device of claim 1, wherein the strip comprises alignment supports disposed at a fixed longitudinal distance of each brace for receiving an alignment guide and facilitating the positioning of the fastening device on the substantially vertical surface.

6. The fastening device of claim 1, wherein the folds comprise at least two folds, namely the first fold and a second fold.

7. The fastening device of claim 6, wherein the flexible portion is comprised between the first and the second folds.

8. The fastening device of claim 7, wherein a distance between the first and the second folds is greater than a distance between any consecutive folds thereafter or than a length of material on the braces after a last fold thereby ensuring that the flexible portion will flex to displace the hook portion.

9. The fastening device of claim 1, wherein the abutment portion extends from the hook portion.

10. The fastening device of claim 9, wherein the abutment portion forms part of the hook portion.

11. The fastening device of claim 1, wherein the strip comprises markings or holes disposed at a fixed longitudinal distance of each brace for facilitating the positioning of the fastening device on the substantially vertical surface.

12. The fastening device of claim 11, wherein the strip has a longitudinal direction and the markings or holes comprise pairs of markings wherein the markings or holes in each of the pairs of markings or holes form a line that is perpendicular to the longitudinal direction of the strip.

13. An assembly, comprising:
    a plurality of siding sheets fastened to a substantially vertical surface, each one of the siding sheets comprising a first end, a second end and a projection portion between the first end and the second end; and
    a plurality of the fastening devices of claim 1 attached to the substantially vertical surface.

14. The assembly of claim 13, wherein the plurality of fastening devices are in a direction perpendicular to the direction of the plurality of siding sheets.

15. The assembly of claim 13, wherein the plurality of fastening devices are for a vertical attachment to the substantially vertical surface and wherein the plurality of siding sheets are for a horizontal attachment to the substantially vertical surface.

* * * * *